United States Patent [19]

McColl

[11] 3,804,137

[45] Apr. 16, 1974

[54] TREE HARVESTING MACHINE OF A WALKING TYPE

[76] Inventor: Bruce J. McColl, P.O. Box 237, Whitby, Ontario, Canada

[22] Filed: Jan. 10, 1972

[21] Appl. No.: 216,412

[52] U.S. Cl.................. 144/3 D, 180/8 R, 280/218
[51] Int. Cl.............................................. A01g 23/08
[58] Field of Search............ 144/2 Z, 3 D; 180/8 R, 180/8 C; 280/218, 219

[56] References Cited
UNITED STATES PATENTS

| | | | |
|---|---|---|---|
| 2,660,253 | 11/1953 | Davidson | 180/8 C |
| 2,777,528 | 1/1957 | Jourdain | 180/8 C |
| 3,592,102 | 7/1971 | Berthiez | 90/56 R |
| 2,132,184 | 10/1938 | Poche | 180/8 C |
| 2,914,127 | 11/1959 | Ricouard | 180/8 C |
| 3,533,458 | 10/1970 | McColl | 144/309 AC |
| 3,618,647 | 11/1971 | Stuart | 144/309 AC |

Primary Examiner—Gerald A. Dost
Attorney, Agent, or Firm—Harold F. Mensing

[57] ABSTRACT

A tree harvesting machine, comprising a mobile platform of the walking type integrated with an automated tree processing unit for use on roadless terrain. The mobile platform comprises a horizontal boom assembly, including a power unit rotationally suspended at one of its extremities with a control unit rotationally suspended at the other, the boom assembly being rotationally mounted on a carriage which also mounts upper and lower body members having retractable legs with foot pads, each of the two body members being able to be moved translationally and rotationally with respect to each other by the carriage means. The paths of travel of each body member lie in a separate plane with the travel plane of one member being spaced vertically from the travel plane of the other. While one member is executing a movement with its foot pads elevated, the vehicle is stably supported by the foot pads of the other member which remain in contact with the ground. The body members alternate between traveling and supporting modes. The body members are basically T-shaped or triangular with the leg members depending from their extremities. Integrated with the boom assembly is a tree harvesting unit capable of severing a tree trunk from its stump, delimbing the trunk, topping the trunk, transferring the trunk to a storage cradle for holding a plurality of tree trunks and subsequently discharging the trunks in a group. Preferably, the laterally extending portions of the mobile platform are foldable along its longitudinal axis and removable road wheel assemblies are provided so that the machine may be readily converted into a configuration suitable for normal highway travel.

20 Claims, 21 Drawing Figures

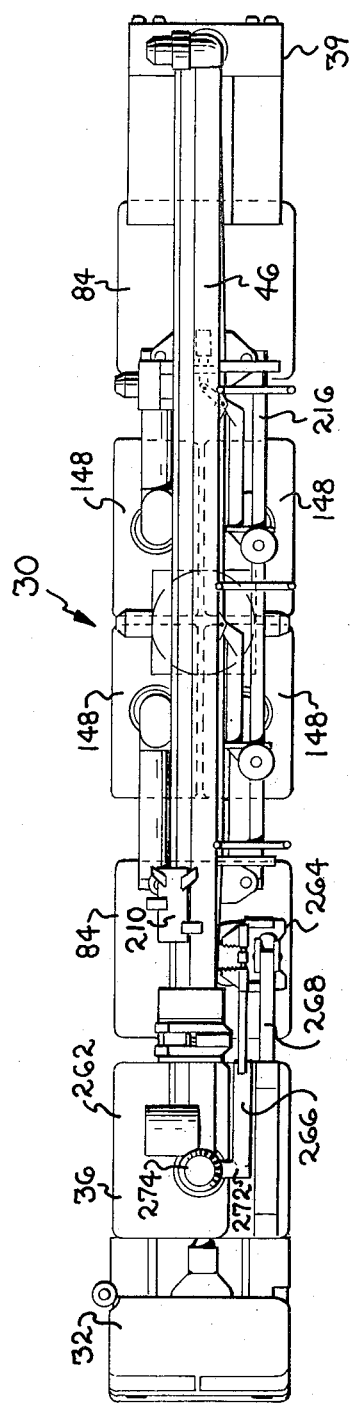
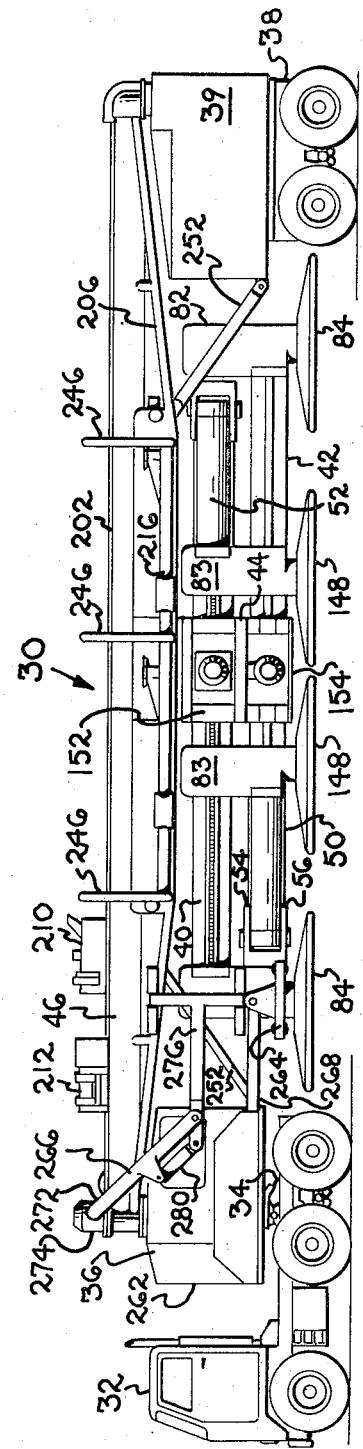

TREE HARVESTING MACHINE OF A WALKING TYPE

BACKGROUND OF THE INVENTION

Efficiency in the production of raw materials for the pulp industry has not kept pace with increasingly efficient pulp and paper mill production developments. Specialization in process and product has provided opportunities for process integration and control, product quality and economies of scale that are in sharp contrast with the traditional methods of harvesting natural forests. However, specialization in the growing of tree species appropriate to pulp production is now evident in forest plantation developments. The need to expand these developments to encompass the whole of the pulp mill raw material production process is obvious if higher levels of efficiency and economy are to be realized by this economically important primary industry. Tree harvesting machines constitute a starting point for the mechanization and automation of pulp mill raw material production.

Numerous tree harvesting machines have been developed and tried in the past but, for a variety of reasons, they have been found unsatisfactory. Mechanical unreliability problems apart, most have exhibited feasibility problems that begin with the mobility characteristics of the vehicle on which tree processing and handling equipment must be mounted, range through the problems of appropriate integration of vehicle and harvesting functions, and end with the problems of harvesting machine transport between sites, and between tracts. The problems center on the vehicle part of harvesting machines, more specifically defined as a mobile platform, or the foundation on which harvesting equipment functions may be structured.

A variety of technical feasibility problems are presented by the economic need for clock-round, year-round operation of production equipment. Harvesting machines must have the capability for operation over the range of ground, terrain and weather conditions that characterize typical pulpwood forest environments if this need is to be satisfied. Where it is technically feasible to operate a pulp mill on a three shift basis for 365 days in the year, tree harvesting machines have been incapable of operation during long periods of wet weather because of ground conditions, during longer periods of cold weather because of deep snow and/or icy grades, and, in many cases, during the hours of darkness because of safety and effectiveness considerations. There are few examples in the current state-of-harvesting machine art where technical feasibility of operation approaches 200 days per year on a three shift basis. The major problems to be solved are functions of the mobile platform; its mobility characteristic, or ability to traverse the ground and terrain on which trees are to be harvested under most weather conditions; its stability characteristic, or ability to provide the ground support needed to permit safe operation of harvesting functions; and its hardware characteristic; or the complex of engineering problems concerned with appropriate machine efficiency, size, weight, cost reliability and life.

A number of technical problems are presented by the need to integrate mobile platform and harvesting functions if higher levels of operating efficiency are to be realized. Appropriate integration means being able to realize multifunctional use of structures, being able to combine production cycles, being able to minimize the need for direct operator control over machine operation and so on. Integration leads to higher levels of automation, and automation demands a high level of control over the operation environment. A major technical problem is presented by the need to precisely advance a harvesting machine on each setting cycle if control over the setting area is to be realized.

The environment imposes a number of constraints on harvesting machine operation. A major constraint is highway transportion codes. Another is increasing restrictions on the size of cut-over areas. Together, these constraints create a technical-economic problem for which current trends in harvesting machine developments offer inadequate solutions. The economic need for rapid site-to-site and tract-to-tract movement capability in harvesting machines is obvious. The technical problems presented by this need are equally obvious. For example, a machine having a sufficiently narrow width to allow its transportation on public roads without special permits is likely to be unstable over a wide range of woodlands operating conditions. On the other hand a harvesting machine having sufficient width to provide the desired stability in operation usually has to be dismantled in order to be moved on a highway to a non-contiguous site or tract. A major problem to be solved for harvesting machines is defined by the need to readily change from harvesting operation configuration to a legal highway transportation configuration.

SUMMARY OF THE INVENTION

Generally speaking, this invention relates to a vehicle of the walking type for use on roadless terrain. More specifically, it relates to a vehicle of this type adapted for carrying a work processing unit, such as a tree harvester, across roadless terrain.

The chassis of the vehicle comprises upper and lower body members connected together by a carriage means for translationally and rotationally moving the body members with respect to each other. The paths of these movements of each body member lie in a single plane with the travel plane of one body member being vertically spaced from the travel plane of the other. A group of supporting leg members having foot pads depends from each body member. Jack means are provided to raise and lower the leg members. To initiate a travel movement of the vehicle, the group of leg members of the first body member to be moved is raised while the group of leg members of the other body member remain in their lowered positions with their foot pads in firm contact with the ground stably supporting the vehicle. After the translational and/or rotational movement of the first body member has been completed, its leg members are moved downwardly until their foot pads exert a supporting force on the ground. Then the body and leg members of the second body member are moved in a similar fashion to complete the second portion of a step in the advancement or turning of the vehicle in the desired direction. Preferably, these movements are planned in advance in accordance with the size and shape of the tract of land involved so that the trees may be harvested with efficiency of travel. The laterally extending portions of the vehicle may be designed to fold back along the longitudinal axis of the vehicle and removable road wheel assemblies provided so that the vehicle may be readily converted into a narrow configuration suitable for highway travel.

Rotatably mounted on the carriage is a structural boom which rotationally suspends a power unit at one of its extremities and a control center at the other. The combination of this structural boom assembly connected with the upper and lower body members by means of a carriage that permits translational and/or rotational movement between them constitutes a mobile platform or vehicle having unique travel characteristics.

Integrated with the structural boom assembly of this mobile platform is a tree harvesting unit capable of severing a tree tunk from its stump, delimbing the trunk, topping the trunk, transferring the trunk to a storage cradle and subsequently discharging a plurality of stored trunks simultaneously. To accelerate the tree harvesting process, the tree severing means is designed so that after the severing operation has been completed and while the balance of the tree trunk processing is being performed it is free to be moved into severing position on the next tree to be harvested. To minimize the time required to move the machine from setting to setting, the mobile platform is designed to be advanced at the same time that the harvesting process is taking place.

Accordingly, it is a general object of this invention to provide a vehicle of simple but rugged construction that is capable of clock-round, year-round operations over roadless terrain with a minimum consumption of energy. It is a more specific object of this invention to provide a walking type vehicle which is adapted for harvesting trees. It is another object of this invention to provide such a vehicle having improved lateral stability. It is still another object of this invention to provide such a vehicle having means for reducing its width and length from an off-road operating configuration to an on-road configuration with width, length and height dimensions which fall within the limits allowed on public highways without special permits. It is yet another object of this invention to provide a tree harvesting vehicle which is designed for automation and production efficiency. Other objects and advantages and the manner of attaining them will become apparent as the following detailed description is read with reference to the accompanying drawings.

BRIEF DESCRIPTION OF THE DRAWINGS

FIG. 1 is a side view on a reduced scale of a tree harvesting machine of the walking type shown in its folded mode ready for transport on a public highway by means of truck tractor and a removable wheel bogie assembly.

FIG. 2 is a plan view of the vehicle in FIG. 1 showing additional details with respect to the folded position of the vehicle crossarms and other elements.

DETAILED DESCRIPTION OF THE INVENTION

Figure 3:
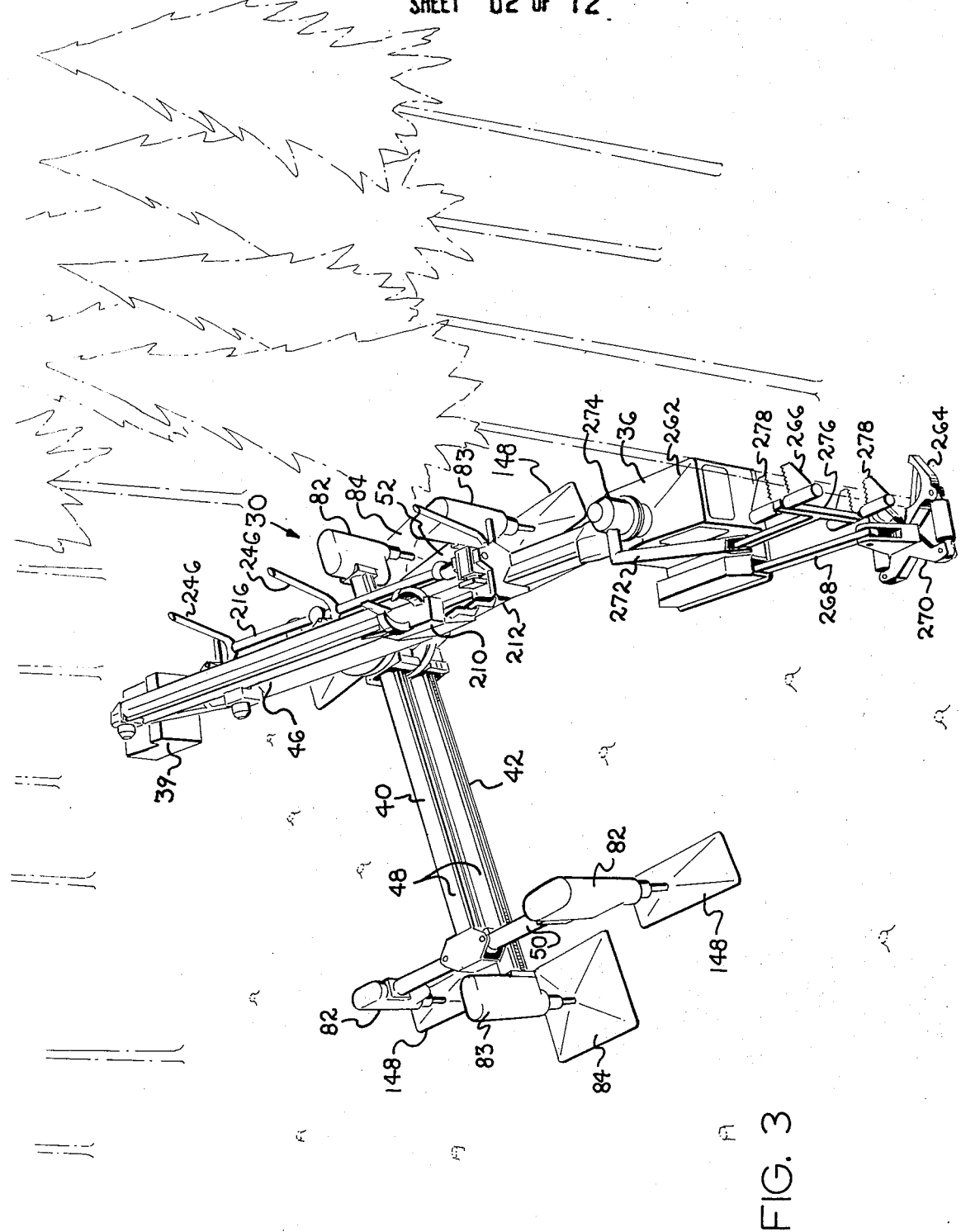
FIG. 3 is a perspective view of the tree harvesting machine of FIG. 1 with the road wheel assemblies removed and with the vehicle in a tree harvesting mode at the beginning of a harvesting cycle.

FIGS. 1 and 2 of the drawings show the tree harvesting machine 30 in its highway mode with a conventional highway tractor 32 connected to the front end thereof by means of a fifth wheel assembly 34 located on a rear portion of the tractor. A kingpin depending from the bottom of the control unit 36 of the machine is releasably locked in the fifth wheel. A bogie wheel assembly 38 is releasably attached to a power unit 39 at the other end of the machine, such as by pin and latch means.

Mobile Platform

Basically, the mobile platform part of the tree harvesting machine has six major components. They are an upper body member 40, a lower body member 42, a carriage 44 movably connecting the body members together and rotatably mounting a boom assembly 46, which rotatably suspends control unit 36 at one of its extremities and power unit 39 at the other. In addition to their primary functions as mobile platform components, carriage 44, boom assembly 46, control unit 36 and power unit 39 provide the structural foundation, power source and control base for harvesting functions, in this case a rough tree length processing and handling machine, which will be described later. In the following description of the various mobile platform components, like parts are denoted by like reference numerals in the several drawings. Also, the terms horizontal and vertical are frequently used to indicate the relative positions of various elements. It is to be understood that the mobile platform may be operated in a horizontal position or at an angle to the horizon and, therfore, the attitude of these various elements will vary accordingly.

The Body Members

The body members 40 and 42 are T-shaped and each has substantially the same component parts as the other so, for the sake of brevity, only one of the members will be described in full detail, it being understood that the description applies to both of them. Both body members have an elongated main beam 48 (see FIGS. 3 and 4), which forms the stem of the T. A pair of crossarms 50 and 52 extend laterally in opposite horizontal directions from one end of each main beam to form the head of the T. Structural steel stock, such as straight tubular stock having a circular or rectangular cross section, may be used for the beams 48 and crossarms 50 and 52. Preferably, the length of the crossarm section is less than the length of the main beam. For example, the crossarm section of the illustrated mobile platform is approximately 20 feet long and the main beam has a length of about 30 feet.

Figure 6:
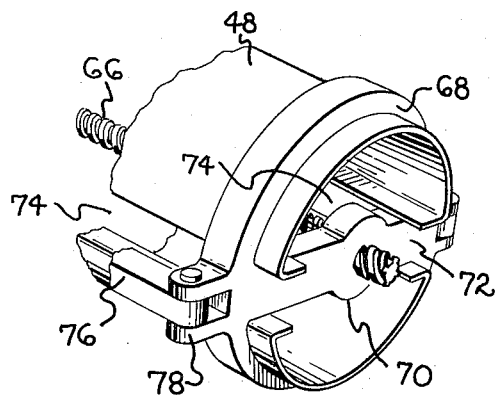
FIG. 6 is a perspective view of the end section of FIG. 5 with its end plate removed and other parts broken away.
Figure 5:
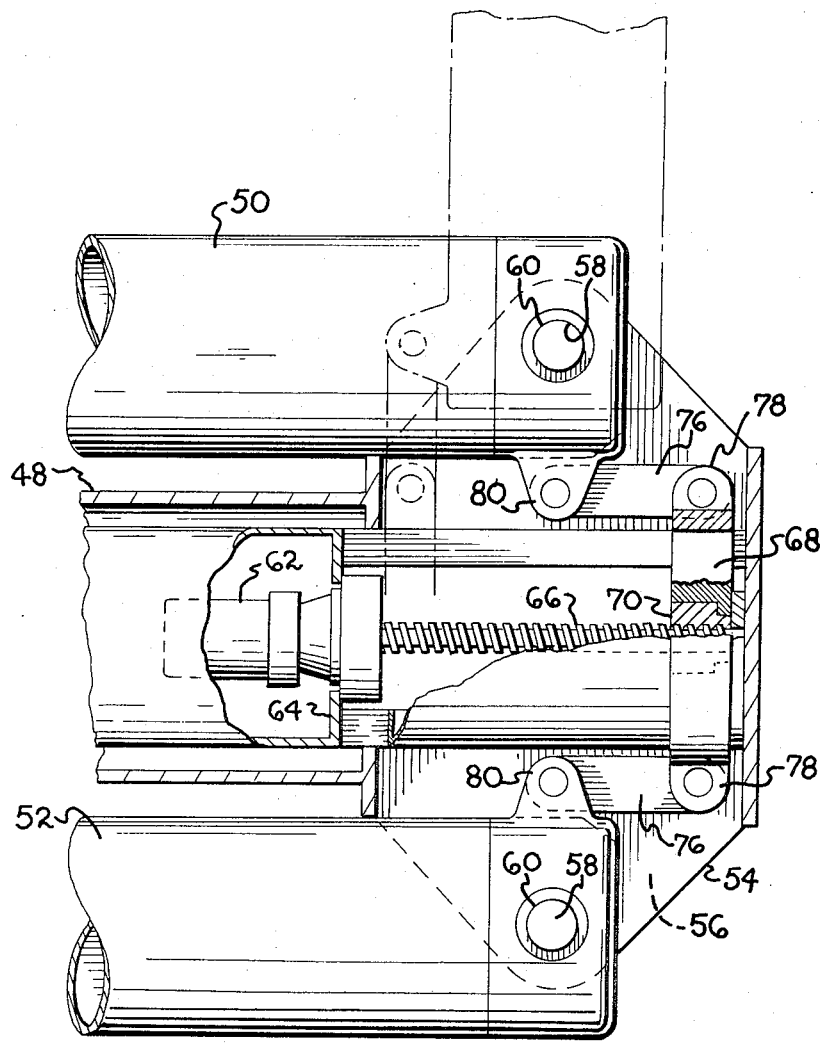
FIG. 5 is an enlarged plan view of the crossarm end of a body beam with parts broken away to illustrate the drive means for folding the leg members along the beam.

Since the maximum vehicular width normally allowable on a public highway is 8 feet, a means may be provided to fold the crossarms inward along the beam and thereby reduce the machine width to within this limit. The preferred folding means shown in detail in FIGS. 5 and 6 comprises horizontally disposed mounting plates 54 and 56 affixed above and below the beam in vertical alignment. The plates extend laterally outward beyond both sides of the beam and have vertically aligned pairs of apertures 58. Gudgeon pins 60 attached to the cross-arm ends adjacent the beam extend into the aligned pairs of apertures and pivotally connect the crossarms to the mounting plates. The pivotal axes of the arms are located sufficiently outward from the beam to enable the arms to be folded back along the beam into a parallel position with respect to the beam and to each other.

To pivot the crossarms from one position to the other, a reversible electric motor 62 is mounted inside the beam end on a bulkhead 64. The motor rotates a threaded jack shaft 66 axially disposed in the beam. A concentric slidable collar 68 embraces the outside of the beam and is reciprocated back and forth on the beam end by an internally threaded hub 70 in engagement with the threaded jack shaft. The collar 68 and hub 70 are integrally connected together by a web member 72, which extends laterally outward from the hub to the collar through horizontal guide slots 74 in the beam end. Rigid links 76 having their ends pivotally coupled to lug members 78 and 80 protruding from the collar and the crossarm end, respectively, form the remaining portion of the folding mechanism. Thus, by rotating the jack screw in one direction or the other, the collar may be moved correspondingly along the beam causing the crossarms to be pivoted about their axes in unison into their folded or extended and locked positions.

Leg Members

Referring again to FIGS. 3 and 4, attached to the outer ends of the crossarms and the stem end of each beam of the upper and lower body members are leg assemblies 82 and 83, respectively. All of the leg assemblies are of equal length and their tops are all at the same elevation. Therefore, the locations of attachment to the body members are higher for the leg assemblies 82 of the upper body member than they are for the leg assemblies 83 of the lower body member. Other than the differences required due to the two different levels of attachment, the leg assemblies are basically alike so a detailed description of one of them will be applicable substantially all.

Figure 7:
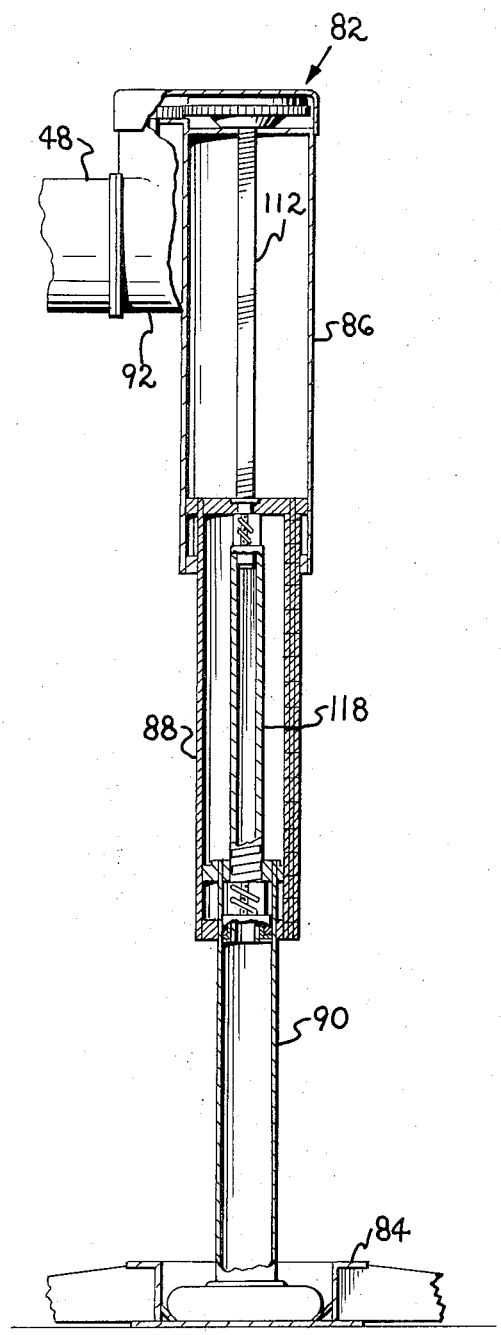
FIG. 7 is an enlarged elevational view in section of one of the leg members and a portion of its foot pad.
Figure 8:
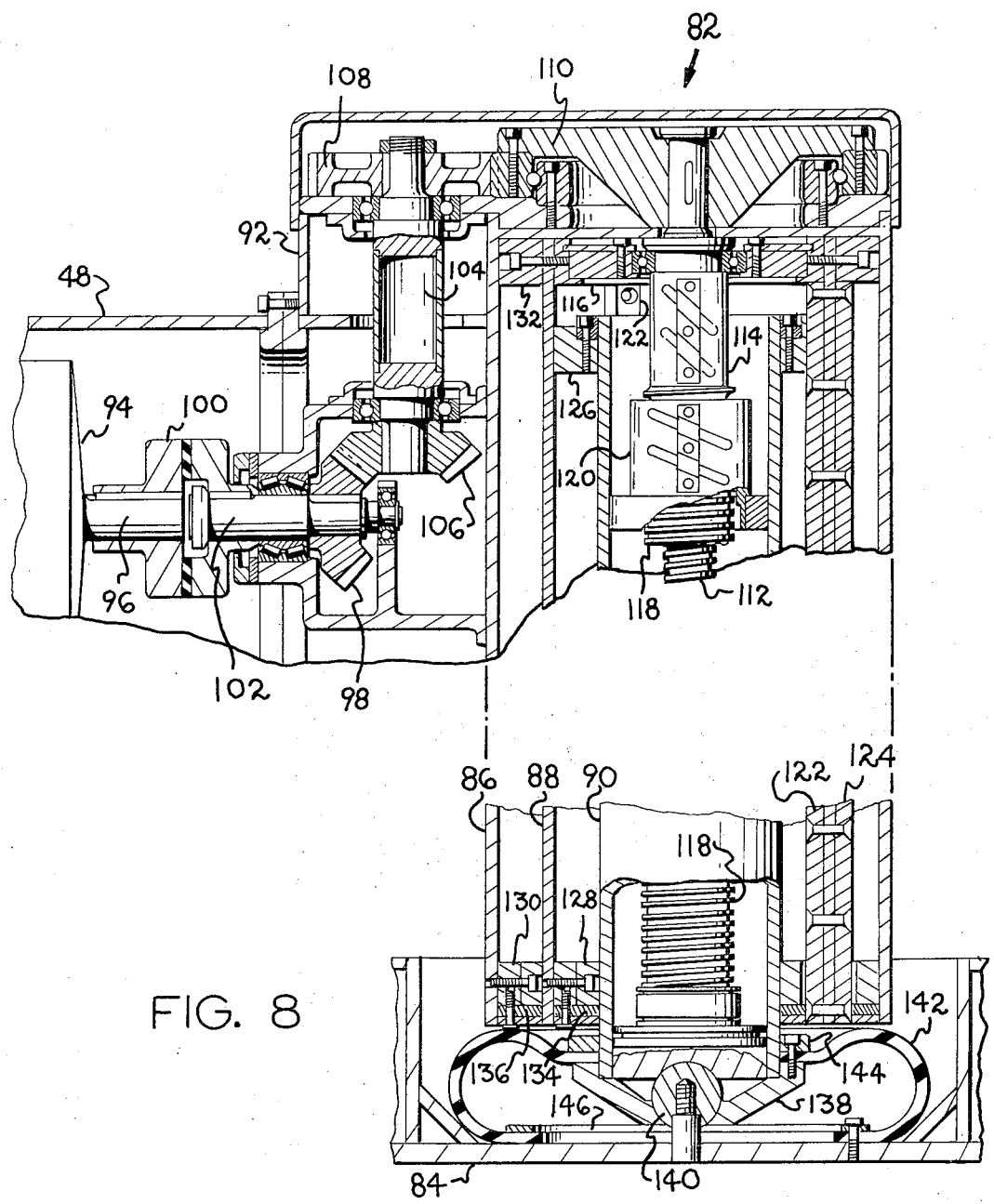
FIG. 8 is an enlarged view of the top and bottom portions of the leg member of FIG. 7 showing details of the jack means for raising and lowering the foot pad and also showing the details of the ball and socket joint connecting the foot pad to the bottom end of the leg.

Referring particularly to FIGS. 7 and 8 of the drawings, leg assembly 82 preferably has three vertically telescoping concentric leg members with reference numerals 86, 88 and 90 denoting, respectively, an outer leg member, an intermediate leg member and an inner leg member. The outermost leg member 86 is rigidly attached to the body member 40, such as the stem end of a beam 48, by means of a housing section 92, which contains a gear drive means. Preferably, this drive means includes an electric motor 94 (see FIG. 8) located inside the adjacent end of the beam. The motor drive shaft 96 is connected to one 98 of a pair of bevel gears of a right angle drive by means of a coupling 100 and shaft 102. A vertically disposed shaft 104 is connected between the other bevel gear 106 and a spur gear 108 mounted directly above it. For a leg assembly 83 attached to a lower body member 42, this vertical shaft will be substantially longer because the vertical distance between the top of its housing section and its right angle drive is greater. The additional length is equal to the distance between the center lines of the vertically spaced body members. The spur gear 108 meshes with a larger diameter gear assembly 110 which is keyed to a vertically disposed central jack screw 112. A ball nut 114 of the recirculating ball type with recirculating channels surrounds and engages the externally threaded central jack screw and is rotatably held in the top end plate 116 of the intermediate leg member 88. Appropriate anti-friction and thrust bearings are provided for the rotatable members of the drive train. A second jack screw 118 having a smooth bore surrounds the first jack screw and is affixed to the lower end of the aforementioned ball nut 114. A second ball nut 120, similar to ball nut 114 but larger, surrounds and engages the externally threaded second jack screw. The second ball nut is affixed to the inside of the inner leg member 90 adjacent its end. With this structure, the leg members may be moved telescoptically by rotating the central jack screw, which in turn rotates the second jack screw through the second ball nut when the rotational resistance between nut 114 and screw 112 is greater than the rotational resistance between nut 120 and screw 118.

If the leg members 86, 88 and 90 are cylindrical in form, longitudinally disposed keys and keyways may be used to prevent rotation of one leg member about another. Preferably, a double key is provided on the intermediate leg member by fixing key members 122 and 124 to adjacent inner and outer surfaces, respectively, of this member. Double keys of this type may be provided at 120° intervals around this member. The leg members are slidably held in their concentric positions by a plurality of annular spacer rings mounted in the annular spaces between the leg members. Annular ring 126 is affixed to the outside of leg member 90 at the top end thereof. The peripheral surface of this ring bears against the inside of leg member 88 and has keyways in its peripheral surface that slidably embraces key members 122. The other annular ring 128 in the space between leg members 88 and 90 is affixed to the inside surface of leg member 88 at its bottom end. The inner circumferential surface of this ring slidably engages the outer surface of leg member 90. A similar annular ring 130 having keyways which embrace key members 124 is affixed to the inner surface of outer leg members 86. The top of intermediate leg member 88 is maintained in its concentric position by an annular spacer ring 132, which is bolted to its outer surface. The bolts may extend radially through ring 132 into plate assembly 116, which rotatably holds ball nut 114. Annular seals 134 and 136 may be incorporated with annular rings 128 and 130, respectively. Although the vertically telescoping type of leg assembly described above is preferred, other types of legs, which are capable of raising and lowering the foot pads, may be used.

Foot Pads

The foot pad 84 of the leg assembly is affixed to the bottom end of leg member 90 by a ball and socket means, which includes a means for limiting the rotational movement of the foot pad about the leg axis. The socket assembly 138 may be mounted on the end of the leg and the ball 140 may be anchored to a central portion of the foot pad. A resilient annular boot 142 having a generally U-shaped cross section is connected between the leg member and the foot pad. The upper circumferential edge is affixed around the leg member 90 by means of an annular flange 144. A similar but larger flange 146 fixes the larger diameter lower circumferential edge to the foot pad. Accordingly, the rotation of the foot pad about the leg axis is prevented while permitting universal joint movement between leg and pad.

There is one foot pad 84 on the leg at the stem end of the beam of each body member and two foot pads 148 on each pair of crossarm legs. Preferably, all of the foot pads are structurally reinforced steel plates of generally rectangular form rather than being of circular or oval form. Extensions may be provided on the sides of the pads to increase their ground engaging area. Foot pad 48 has a basic ground engaging area less than twice the ground engaging area of a pad 148. For example, to support the tree harvesting vehicle, which has a gross weight of about 60,000 pounds on ground of average firmness, pad 48 may be eight foot square and pads 148 each may be 4 to 6 by 9½ foot rectangles. Pads 148 are oriented on their legs so that when the crossarms are in their folded positions for highway transport, the pads are side by side with their longitudinal axes paralleling the beam.

Carriage

Figure 4:
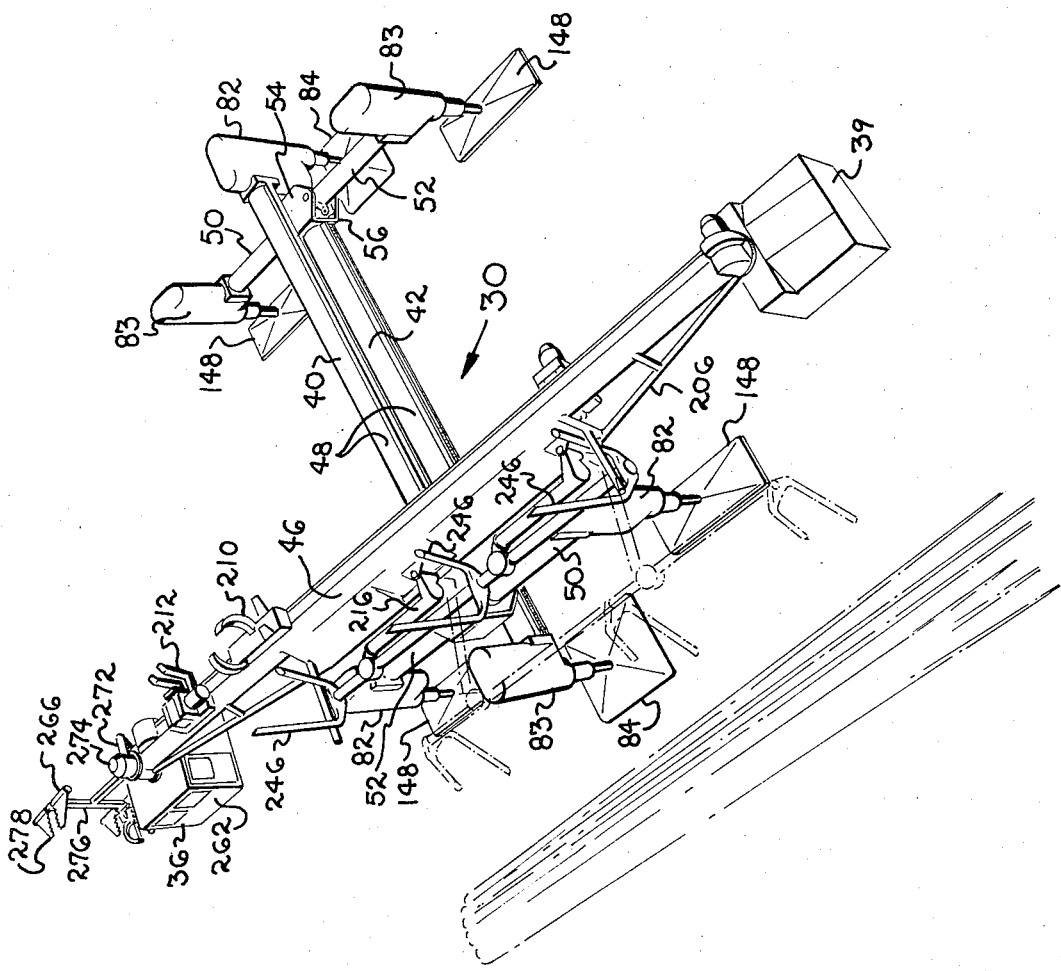
FIG. 4 is a view similar to that of FIG. 3 but with the tree harvesting unit in dumping position at the rear end of the vehicle after having completed a harvesting cycle.
Figure 9:
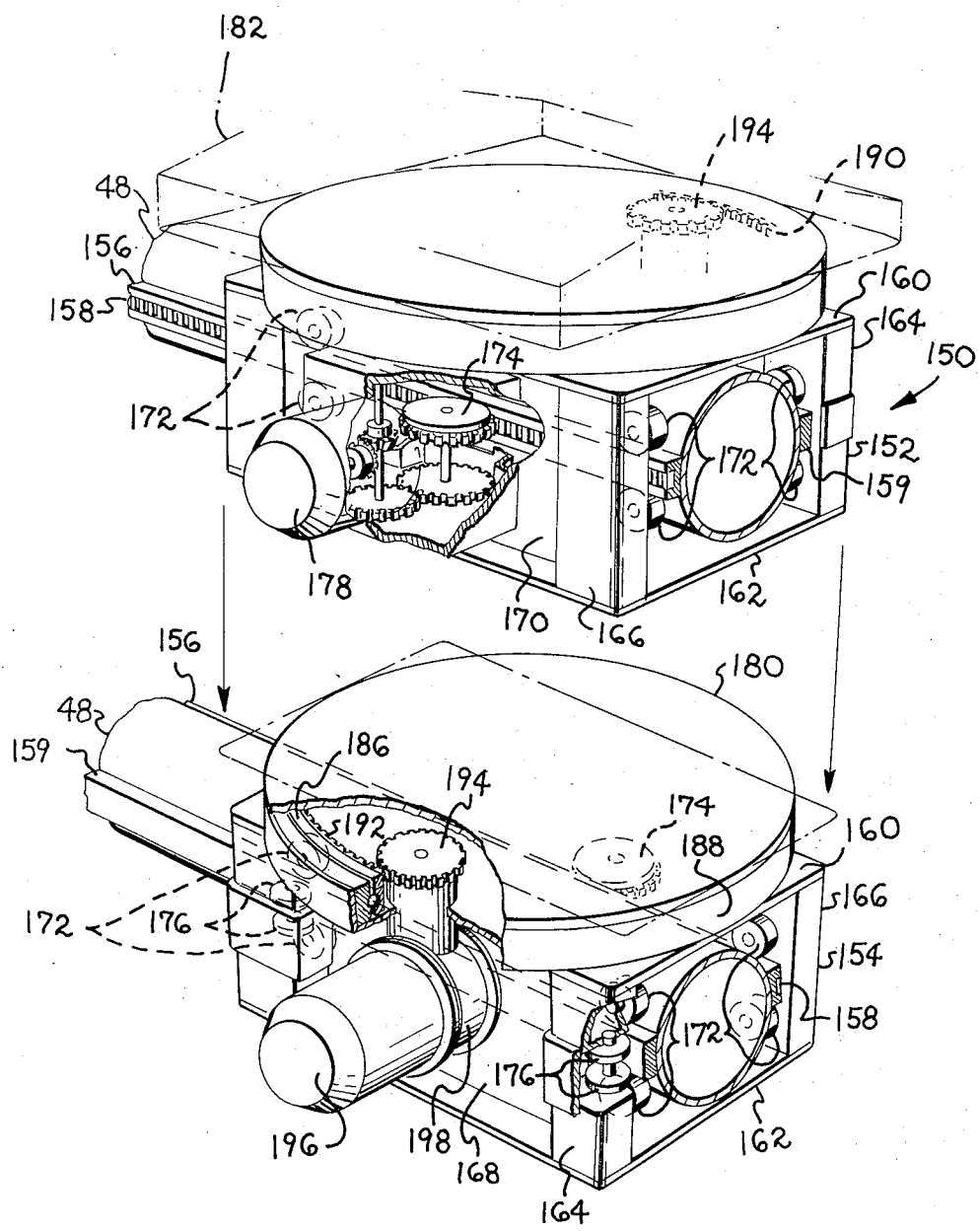
FIG. 9 is an enlarged perspective view of the carriage assembly with the upper and lower sections being vertically displaced from their normal positions in contact with each other to illustrate their details more clearly.
Figure 10:
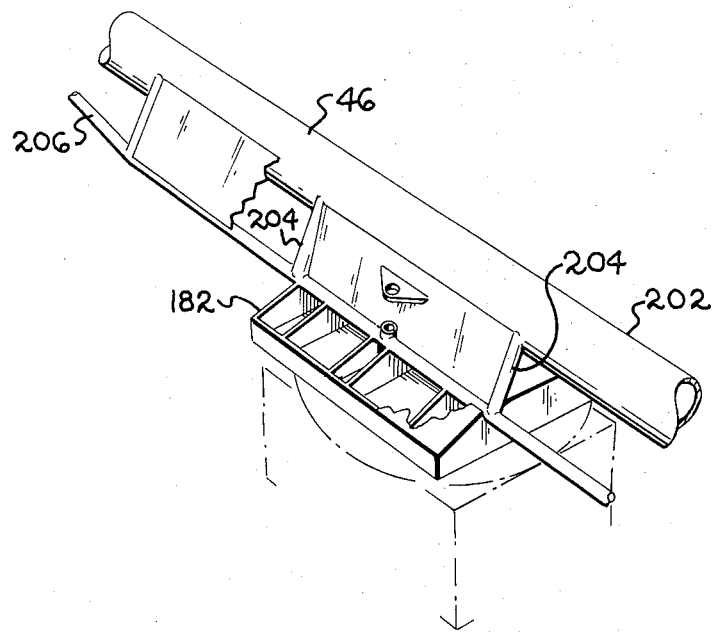
FIG. 10 is a perspective view of the midsection of the boom assembly showing its base for mounting on the carriage.

Normally, the body members 40 and 42 are oriented so that the crossarm end of one body member is adjacent the stem end of the other body member (see FIGS. 3 and 4). A carriage assembly 150 movably holds the longitudinal beams of the two body members in spaced apart parallel planes of travel that are generally horizontally disposed (see FIG. 9). The carriage assembly comprises upper and lower sections 152 and 154, which movably embrace, respectively, the upper and lower body members and are rotatably connected together for swinging about an axis that is perpendicular to the aforementioned travel planes. Load carrying rails are provided on opposite sides of each beam along the full length of lines formed by the intersection with the outer surface of the beam of a horizontal plane passing through the longitudinal axis of the beam. One of the rails of each beam is a drive rail 156 that includes a co-extensive rack gear section 158 while the other rail 159 may simply have flat bearing surfaces. These rails also prevent turning of the carriage sections around the longitudinal axes of the beams and provide positive drive surfaces by which the carriage assembly may be moved along the beams.

The lower carriage section 154 has a generally rectangular box-like housing, which is similar to the basic housing of upper carriage section 152. However, when the upper and lower body members are in their normal vertically aligned positions, the body members and likewise the carriage sections are 180° from symmetric positions so, in effect, the structure on the rear side of one carriage section will be shown on the front side of the other and will be described accordingly. The housing of the lower carriage section 154 has horizontally disposed rectangular plates 160 and 162 located, respectively, above and below the beam in vertical alignment. Vertical wall members 164 and 166 located on opposite sides of the beam extend between the horizontal plates and have recessed motor mounting plates 168 and 170, respectively. Rollers 172 mounted in opposite ends of the carriage section engage the top and bottom sections of the drive rail 156 and guide rail 159 to prevent vertical movement or tilting of the carriage section with respect to the beam. Lateral movement of the carriage is prevented by snugly sandwiching the rails 158 and 159 between a horizontally disposed drive gear 174 which engages the rack gear section of rail 158 and pairs of horizontally disposed rollers 176, which engage the outside surface of rail 159. Shown best in the upper carriage section is a combination gear reducing unit and reversible electric motor 178 mounted on recessed plate 170 for rotating gear 174 and thereby moving the upper carriage section 152 along the beam of body member 40. Lower carriage section 154 has an identical drive means mounted on its hidden side whereby it may be moved along the beam of body member 42.

Carriage Turntables

Rotatably affixed to the top surface of top plate 160 of the lower carriage section is a circular mounting plate 180 to which the bottom plate 162 of the upper carriage section is rigidly attached, such as by welding. A structurally reinforced base plate 182 for the boom assembly is rotatably affixed to the top surface of top plate 160 of the upper carriage section. To retain the mounting plates 180 and 182 on their respective housing plates 160, an annular bearing assembly is provided for each of the two mounting plates. The bearing assemblies each have inner 186 and outer 188 bearing race members with cooperating circumferential grooves in their confronting surfaces. Ball bearings contained in these opposed grooves lock the bearing race members against lateral movement with respect to each other. The outer race members are affixed to plates 160 and the inner race members are affixed to the mounting plates 180 and 182. A ring gear 190 is rigidly connected to the inner circumferential surface of the inner race member of the bearing assembly on the upper carriage section. A similar ring gear or ring gear segment 192 of 60° or more is likewise connected to the inner race member of the bearing assembly on the lower carriage section. To rotate the mounting plates 180 and 182, horizontally disposed spur gears 194 engage their ring gear teeth. Each of the carriage sections has an identical drive means which is best shown in the lower carriage section. The drive means comprises a reversible electric motor 196 with a right angle gear drive and reduction unit 198 connecting it to spur gear 194 and mounted on recessed plate 168. Rotation of the circular mounting plate 180 of the lower carriage section serves to rotate the beams of the body members with respect to each other about a vertical axis. Due to the interference between the leg assemblies of one body member with the beam of the other body member, the rotation is limited to about 30° either way from center.

Boom Assembly

The base plate 182 of the boom assembly 46 may be rotated through a partial revolution or one or more complete revolutions in either direction around a vertical axis. The boom assembly has a length substantially greater than the length of the body members. For example, the boom may be about 50 feet long for a mobile platform having body members about thirty feet long.

The structural members of the boom assembly include a horizontally disposed tubular steel boom member 202 supported above the base plate 182 on the apices of a plurality of laterally disposed and vertically oriented tubular A-frame members 204 arranged symmetrically at intervals under the major portion of the boom. A pair of longitudinally disposed tubular members 206 are connected to the lower ends of the A-frame members and are rigidly fastened at their midsection to the base plate 182. Adjacent ends of the tubular members 206 converge upwardly and are affixed to the underside of the boom adjacent its ends.

Tree Processing

Figure 11:
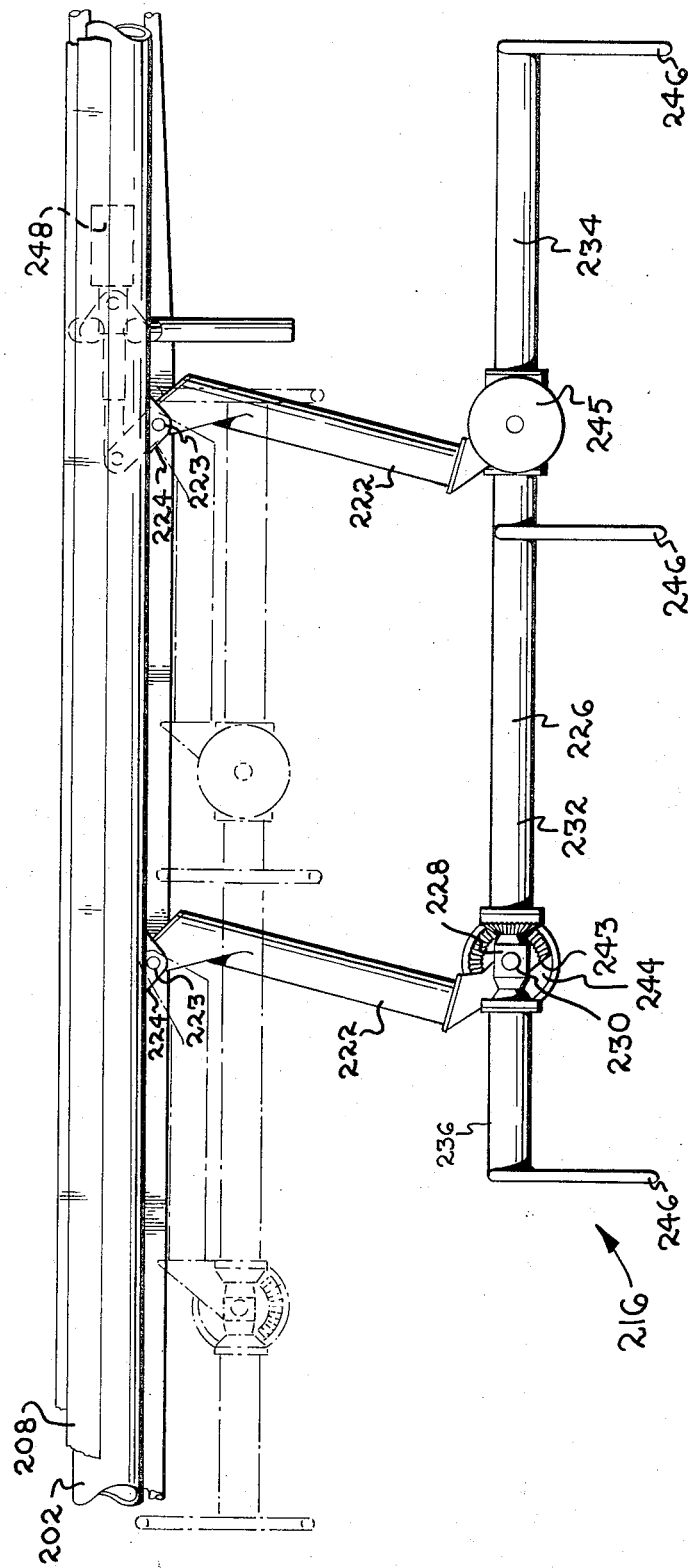
FIG. 11 is an enlarged plan view of the tree trunk storage cradle assembly and a section of the boom assembly.
Figure 13:
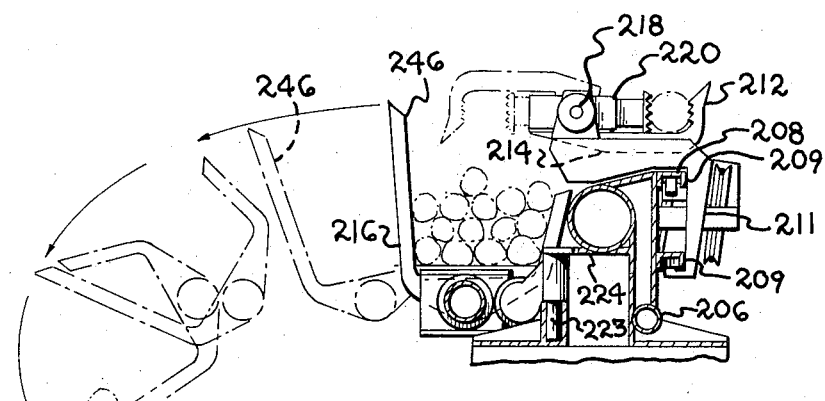
FIG. 13 is a cross sectional view of the boom assembly taken at its midsection showing the tree trunk gripping and transfer assembly together with the cradle assembly.

A track 208 (see FIG. 13), upon which one or more tree trunk processing units, such as a delimber and topping shear unit 210 may travel, is provided along one side of the boom. The track may comprise two parallel channels 209, which are vertically spaced and aligned and have U-shaped cross sections that open downwardly. Also mounted for travel along the boom track by means of a dolly 211 is a gripping and transfer unit 212 which embraces a severed horizontally disposed tree trunk at a point near its center of gravity and thereby holds the tree trunk in a fixed position along the boom. After the delimbing and topping has been completed, the transfer arm 214 swings the tree trunk laterally through an arc of 180° from the processing side of the boom to the storage side of the boom where the tree trunk is released to fall into a storage cradle assembly 216 (see FIG. 11). The mechanism for accomplishing these results comprises the upwardly open hooked transfer arm 214, which is mounted on an axis 218 paralleling the boom. A reciprocable ram 220 located on the shank end of the hooked arm releasable holds a tree trunk against the hooked end of the arm.

Storage Cradle

Figure 12:
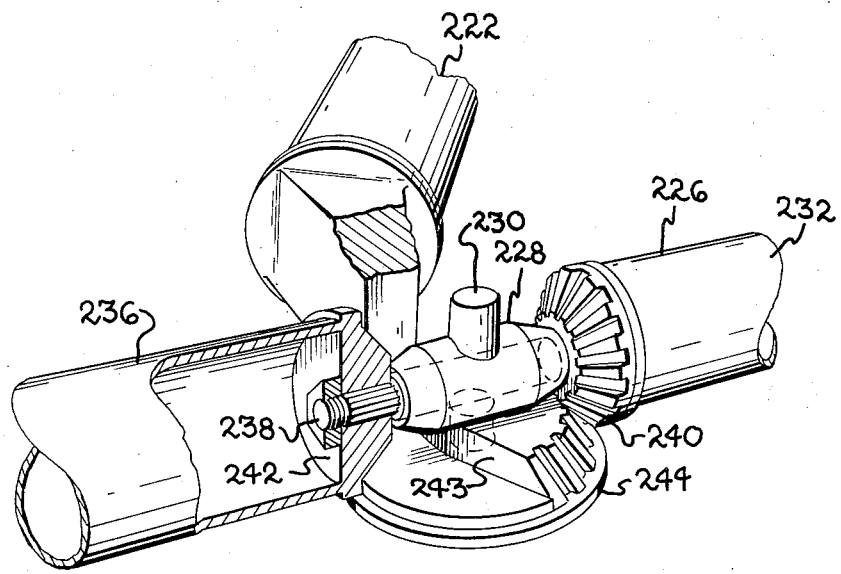
FIG. 12 is an enlarged perspective view of the geared joint for rotating the cradle into dumping position as the cradle is being moved laterally away from the boom.

The storage cradle assembly 216 connected on one side of the boom is designed so that its cradle may be moved laterally outward from the boom and simultaneously tilted from a holding attitude to a dumping attitude. The details of this assembly are illustrated best in FIGS. 11–13, which show a pair of horizontal arms 222 pivotally mounted on vertical shafts 223 journaled in bolsters 224 at spaced apart fixed locations on the boom. Preferably, the arms are of equal length and their distal ends are connected to a segmented spar 226 by a pair of trunnions 228 having vertical spindles 230, which have their axes spaced apart the same distance as the aforementioned shafts 223. The spar 226 has a center section 232 affixed to two aligned end sections 234 and 236 by a pair of splined shafts 238. Each shaft 238 has splined ends and an enlarged central portion that is rotatably held in a horizontal bore extending through the center of its respective trunnion 228. The length of the smooth central portion of the shaft is greater than the length of the bore section of the trunnion. Annular shoulders are formed on the shaft between its enlarged central portion and the smaller diameter splined ends. An internally splined 45° bevel gear 240 and a similar 45° bevel gear blank 242 are fitted on the correspondingly splined ends of the shaft 238 with the small end faces of the gear and gear blank firmly held against their respective annular shoulders. Preferably, the large end face of the gear blank is affixed to an end of the spar center section 232 and the gear blank is similarly affixed to an adjacent end of a spar section 236. A similar connection may be made between the other end of the spar center section and the adjacent end of spar section 234. The lower end of spindles 230 of the trunnions 228 are rotatably held in the bores of larger diameter 45° bevel gear segments 243 rigidly connected to circular plates 244 affixed to the outer ends of arms 222. The upper ends of the spindles 230 are journaled in circular plates 245, which are also affixed to the outer ends of arms 222. The closed ends of a plurality of laterally disposed U-shaped cradle arms 246 are attached to the spar sections so that their open ends face upwardly when the cradle is in receiving position along the boom. The cradle is moved between this position and its remote dumping position by means of a linear actuator 248 connected to a lateral extension on the boom end of one of the arms 222. The linear actuator may be a jack screw rotated by a reversible electric motor. The bevel gear assemblies cause the spar to be rotated about its longitudinal axis as it is moved in a lateral direction from one position to another. When the spar is in its remote position from the boom, the cradle arms point downwardly so that the plurality of tree trunks accumulated therein during a harvesting cycle are discharged onto the ground in a pile.

Power Source

Connected to one of the ends of the boom assembly 46 is a motive power source, such as a motor generator unit, which furnishes electric power to energise the electrical components of the harvesting machine including the electric motors that drive the mechanical actuators and the hydraulic system pumps. Preferably, the unit is mounted for rotation about a vertical axis located adjacent one of its ends. Accordingly, the unit may be rotated 180° from its normal operating position in which a major portion of its length extends beyond the boom end (see FIG. 4) to its highway mode position in which the major portion of its length lies under the boom end (see FIGS. 1 and 2). When the power unit is in the latter position, stay assemblies 252 may be connected from its inner corners to points on the boom assembly and likewise to control unit 36, to anchor these units for long distance highway transport (see FIG. 1).

Control Unit

Similarly connected on the other end of the boom assembly 46 is a control unit 36 comprising the operator's control cab 262, a shear assembly 264 for severing a tree trunk from its stump and a grasp assembly 266 for holding the tree trunk at the time of severance and for subsequent transfer. Preferably, these components are mounted for rotation about a single vertical axis with the rotation of the grasp assembly being independent of the rotation of the control unit within limits. The shear assembly includes a vertically reciprocable arm 268 hingedly mounted on the base of the control unit. The arm extends beyond the front of the unit a substantial distance and has self-leveling, hydraulically driven shear means 270 on its distal end. Movement of the shear arm in horizontal directions is achieved by rotating the unit about its vertical axis. The grasp assembly has a downwardly inclined arm 272 affixed to a rotatable hub 274 mounted on the top side of the boom assembly. A T-shaped arm 276 disposed in a vertical plane is pivotally connected to the lower end of the inclined arm by its stem end. The head end of the T-shaped arm has two pairs of movable jaws 278 for gripping a tree trunk. A hydraulic cylinder and piston means 280 connected between the inclined arm and an extension of the stem end of the T-shaped arm provides means for tilting a severed tree trunk into a horizontal position along the boom where it is received and held in this position by the aforementioned gripping and transfer unit 212. Since the shear and grasp assemblies are capable of being moved independently of each other, the movement of the shear assembly towards the next tree to be severed may be initiated while the previous tree trunk is being positioned along the boom.

Harvesting Pattern

The preferred harvesting pattern comprises a series of crescent-shaped swaths being cut in a stand of trees. The boom is rotated through an arc of 180° during the harvesting portion of a setting cycle. The shear arm may be rotated through an arc of 140° to position the shear on each tree within the crescent-shaped area so formed at each setting. The total area of the crescent-shaped swath is approximately one-fortieth of an acre and contains about ten to fourteen trees on a forest stand of average density. After the cutting swath has been completed, the boom is at the rear of the vehicle where it discharges the harvested tree trunks in a pile on the ground as shown in FIG. 4. The boom is rotated the remaining 180° and the cutting cycle is repeated. During the first portion of the harvesting cycle carriage 44 is advanced to the front of the mobile platform and during the last half of the harvesting cycle body members 42 and 44 are advanced sequentially. Preferably, the machine is walked in a straight line until it reaches the end of the strip to be harvested and then is turned 180° to harvest the trees in an adjacent strip.

Travel Movements

Figure 14:
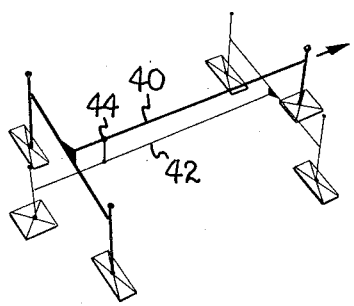
FIGS. 14–16 are schematic diagrams in perspective showing the relative positions of the body members and carriage as the harvesting machine is advanced one step in a forward direction.
Figure 15:
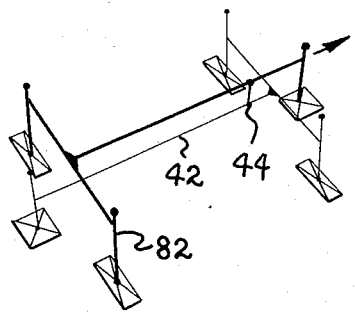
Figure 16:
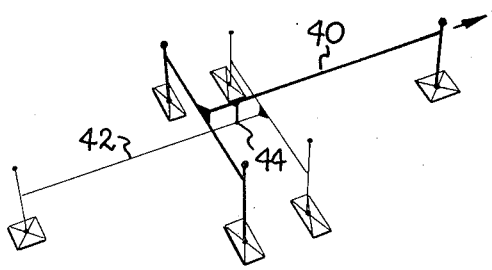
Figure 17:
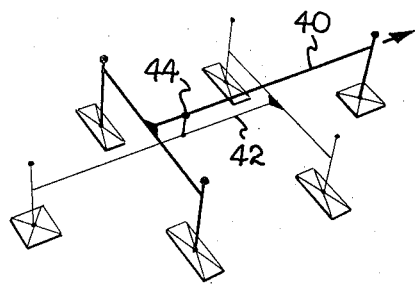
FIGS. 17–21 are similar schematic drawings showing various additional positions of the body members and carriage during a 90° right turn.
Figure 18:
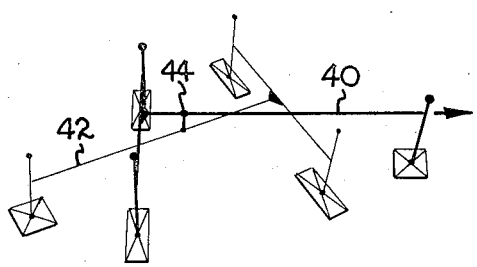
Figure 19:
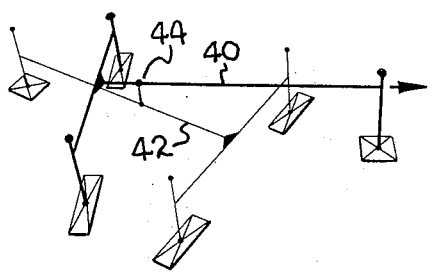
Figure 20:
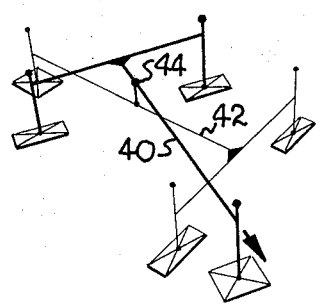
Figure 21:
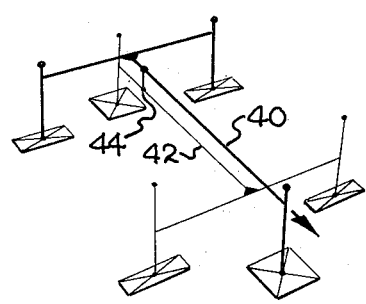

Referring to the schematic diagrams in FIGS. 14–16, FIG. 14 shows the relative position of the mobile platform walking components immediately after discharge of a load of tree trunks from a harvesting cycle or a normal travel sequence. The first step in advancing the vehicle is to move the carriage to a forward position as shown in FIG. 15. Then the foot pads of the upper body member 40 are raised and the upper body member is moved forward one step after which its foot pads are lowered into supporting contact with the ground as shown in FIG. 16. The step is completed by raising the foot pads of the lower body member 42 advancing it to its normal position under the upper body member and then lowering its foot pads into supporting contact with the ground as shown in FIG. 14.

Turning movements are accomplished by rotating a body member when its legs are in the raised position. FIGS. 17–21 schematically show the other relative positions of the body members and the steps involved in making a 90° right turn. Beginning with the vehicle members positioned as described in FIG. 14 above, the foot pads of the lower body member are raised and this body member is moved rearward about one-half step and the foot pads are then lowered (see FIG. 17). Then the foot pads of the upper body member are raised, the body member is rotated 30° horizontally to the right, and the foot pads are lowered (see FIG. 18). Next, the foot pads of the lower body member are raised again and it is rotated 60° horizontally after which the foot pads are returned to the ground (see FIG. 19). Then, the foot pads of the upper body member are raised, it is rotated 60° and the foot pads are lowered (see FIG. 20). The turn is completed by raising the foot pads of the lower body member, rotating it 30°, advancing it into its normal position directly below the upper body member and then lowering the raised foot pads back to the ground (see FIG. 21). By reversing the direction of rotation, a 90° left turn may be made. By taking four normal settings and then repeating the sequence described above, a 180° turn may be made thereby placing the vehicle in position to harvest the tree in a travel path that is parallel and contiguous with the preceding travel path. Precision advancing and/or turning movements of a lesser extent may also be made. It is evident that these and other sequences in a family of sequences made possible by this machine may be programmed.

While the invention is described with reference to the drawings which show a preferred embodiment of the invention, it is to be understood that other embodiments may be obvious and, therefore, the scope of the invention is to be limited primarily by the appended claims.

I claim:

1. A walking vehicle comprising: an upper body member, a lower body member, each of said body members having a generally horizontally disposed main beam section, a horizontally disposed crossarm section adjacent one end of said main beam section, said crossarm section having two coaxially disposed crossarms extending laterally of said beam section one from each side and with the crossarm sections of said body members being disposed at opposite ends of said vehicle, a carriage means for rotatably and translationally moving said members with respect to each other in vertically spaced parallel reference planes, said carriage means mechanically connecting said body members together, a source of motive power, a plurality of leg members depending from said body members, foot pads attached to the lower ends of said leg members, and a jack means on each of said body members for raising and lowering its leg members.

2. A walking vehicle according to claim 1 wherein said crossarms are pivotally mounted on said main beam section whereby said crossarms may be folded back along said main beam section to reduce the width of said vehicle for transportation on public roads.

3. A walking vehicle comprising: an upper body member, a lower body member, a carriage means for rotationally and translationally moving said members with respect to each other in vertically spaced parallel reference planes, said carriage means mechanically connecting said body members together, a source of motive power, said body members each having at least three generally vertically mounted independent reciprocable leg members with foot pads connected to the lower ends thereof by universal type joint means, each of said universal type joints including a ball and socket joint and an annular flexible boot having a U-shaped cross section with an upper circumferential edge portion affixed to said leg member and a lower circumferential edge portion affixed to said foot whereby the rotation of said foot about the leg axis is prevented while permitting other rotational movements, and a jack means on each of said body members for raising and lowering its leg members.

4. A walking vehicle comprising: an upper body member, a lower body member, a carriage means for rotationally and translationally moving said members with respect to each other in vertically spaced parallel reference planes, said carriage means mechanically connecting said body members together, a generally horizontally disposed boom assembly having two ends mounted atop said carriage, an electric generator unit rotatably suspended from one of said ends and an operating unit rotatably suspended from the other end of said boom assembly, a plurality of leg members depending from said body members, foot pads attached to the lower ends of said leg members, and a jack means on each of said body members for raising and lowering its leg members.

5. A walking vehicle according to claim 4 wherein said operating unit includes a means for severing a tree trunk from its stump and a means for tilting a severed tree trunk into a horizontal position along the boom.

6. A mobile work processing vehicle of the walking type suitable for travel over roadless terrain, said vehicle comprising: an elongated upper body member, an elongated lower body member, said body members each having at least one pair of crossarms extending laterally outward from an end thereof, a carriage means connected between said members for rotationally and translationally moving said members with respect to each other in vertically spaced parallel reference planes, a work processing unit rotatably mounted atop said carriage, a plurality of leg members depending from each of said body members, jack means for raising and lowering said leg members, foot pads connected to the lower ends of said leg members by means of flexible joints, and a motive power source.

7. A work processing vehicle according to claim 6 wherein each of said body members is T-shaped with a generally horizontally disposed main beam section connected to the central portion of a crossarm section located adjacent only one end thereof and with the crossarm end of one body member being normally oriented adjacent the stem end of the other body member.

8. A work processing vehicle according to claim 7 wherein said crossarm section comprises a pair of pivotally mounted crossarms which may be folded back along said main beam section and the ratio of the main beam length to the crossarm section length is greater than 1.

9. A work processing vehicle according to claim 8 further including a drive means for moving said crossarms from one horizontal position to another.

10. A work processing vehicle according to claim 6 wherein said flexible joints include ball and socket joints having flexible annular boots with one circumferential edge of each boot affixed to a leg member and the other circumferential edge of the boot affixed to its foot pad whereby rotation of said foot pads about the leg axis is prevented while permitting rotational movement in other directions.

11. A work processing vehicle according to claim 6 wherein said jack means is a mechanical screw jack means powered by a reversible electric motor.

12. A work processing vehicle according to claim 6 further including means for removably attaching wheel means adjacent opposite ends of said vehicle.

13. A work processing vehicle according to claim 6 wherein said work processing unit is a tree harvester.

14. A tree harvesting machine of the walking type for traveling over roadless terrain, said machine comprising: an upper body member; a lower body member; a carriage means for rotationally and translationally moving said members with respect to each other in vertically spaced parallel reference planes, said carriage means mechanically connecting said body members together; a motive power source; a plurality of leg members depending from each of said body members; means on each of said body members for raising and lowering its respective leg members; foot pads attached to the lower end of said leg members; and a tree harvesting unit rotatably mounted on said carriage, said tree harvesting unit including a generally horizontally disposed boom assembly having two ends with said motive power source rotatably suspended from one end, an operating unit rotatably suspended on the other end thereof, a means carried by said operating unit for severing the trunk of a tree from its stump, a tree grappling means, a tree delimbing means, a tree topping means, a receptacle for holding a plurality of processed tree trunks in a pile and means for discharging said pile of trunks from said vehicle.

15. A tree harvesting machine according to claim 14 wherein each of said body members is T-shaped with a generally horizontally disposed main beam having a pair of laterally extending crossarms attached to one end of said beam and with the crossarm ends of one body member being disposed normally adjacent the stem end of the other body member.

16. A tree harvesting machine according to claim 15 wherein means including a drive means are provided to rotate the crossarms horizontally into parallel positions along the boom.

17. A tree harvesting machine according to claim 16 further including means for attaching wheel assemblies thereunder.

18. A work processing vehicle comprising: an upper body member, a lower body member, a carriage means drivingly connecting said body members together, for rotationally and translationally moving said members with respect to each other in vertically spaced parallel reference planes, said carriage means being translationally movable with respect to said body members, a boom mounted on said carriage for rotation in a travel plane paralleling said reference planes, a source of motive power, a plurality of leg members depending from said body members, foot pads attached to the lower ends of said leg members, and a jack means on each of said body members for raising and lowering its leg members.

19. A work processing vehicle according to claim 18 wherein said jack means comprises a mechanical screw type jack having at least three relatively telescoping members and said jack means is actuated by an electric motor.

20. A work processing vehicle according to claim 18 wherein said motive power source is mounted on one end of said boom and an operating unit is mounted on an opposite end of said boom.

* * * * *